March 25, 1969  R. G. C. SERRET  3,434,326

METHOD AND APPARATUS FOR MAKING ANNULAR PARTS OF U-SECTION

Filed April 14, 1967

INVENTOR
ROBERT G. C. SERRET
BY
Bacon & Thomas
ATTORNEYS

United States Patent Office 3,434,326
Patented Mar. 25, 1969

3,434,326
METHOD AND APPARATUS FOR MAKING ANNULAR PARTS OF U-SECTION
Robert G. C. Serret, Paris, France, assignor to Societe anonyme dite Etablissements Bauche (Coffres-forts Bauche et Nicolle et Cie), Montreuil, Seine-Saint-Denis, France, a French society
Filed Apr. 14, 1967, Ser. No. 630,979
Claims priority, application France, Apr. 19, 1966, 58,222
Int. Cl. B21d 22/02, 31/04
U.S. Cl. 72—354     6 Claims

ABSTRACT OF THE DISCLOSURE

A method and apparatus for making annular articles of any desired shape from a blank consisting of a sleeve and a flange. The blank is placed in the second hole of a lower matrix having a first hole closed at its lower end by a movable closure member having a blank hole therein. The second hole is on the upper surface of the matrix and has a depth greater than the thickness of the flange of the blank. The sleeve is displaced with respect to flange and the flange is simultaneously displaced by an upper die member which fits into second hole to press against the flange and a plunger carried in the upper die member which forces the sleeve into the first hole to thereby form the finished article.

---

This invention relates to a method and apparatus for making annular parts of U-section having any desired external peripheral face, and any suitable central opening. The parts are made from roughly cut-blanks each having a sleeve and a flange.

According to the process of the invention, in order to obtain the desired finished part, there is produced simultaneously an axial displacement of the sleeve with respect to the flange and deformation of the metal of the flange to form a narrow annular part which surrounds the displaced sleeve.

The pressing apparatus of the invention for carrying out the above-mentioned process comprises a lower matrix having a first hole therethrough which is closed at its lower end by a closure member, and of which the internal lateral face corresponds to the lateral external face of the finished annular part, and a second hole co-axial with the first of which it is a continuation, leading to the upper surface of the matrix and of a depth greater than the thickness of the flange of the blank, an upper die member adapted to penetrate the second hole of the matrix and itself having a hole of which the diameter corresponds to the external diameter of the sleeve of the blank, and an upper plunger slidably mounted in the hole of the die member, of which the lower extremity has over a length substantially equal to the height of the finished part, a diameter which corresponds to the diameter of the central opening of the blank.

Other characteristics of the invention together with its advantages will appear during the course of the following description of one embodiment of the invention given by way of example. Reference will be made to the accompanying drawing in which.

Figure 2:
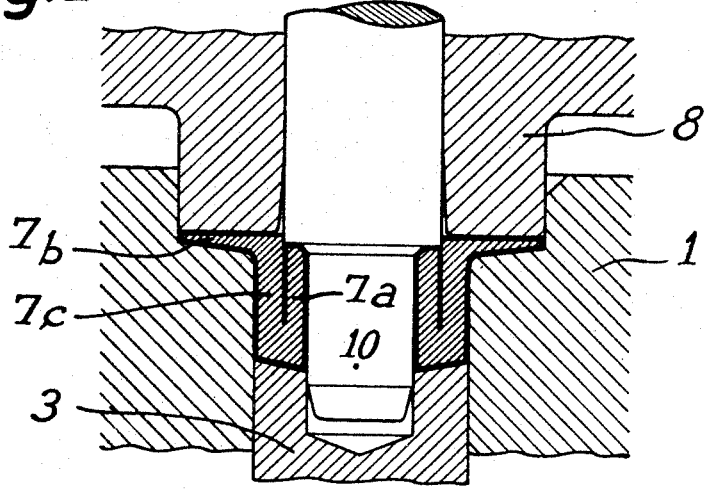
FIG. 2 shows the same apparatus with a finished annular part after the process has been performed.

The apparatus shown comprises a lower matrix 1 having therethrough a first hole 2, of which the internal lateral face corresponds to the lateral external face of the finished annular part which can be seen in FIG. 2.

This hole 2 can be of circular section but it can have any other form according to the exterior surface of the finished part which it is desired to obtain. In the case envisaged, a hexagonal shape was chosen.

The hole 2 is closed by a bottom portion 3 which is vertically displacable in the lower matrix. This portion 3 has a blind hole 4 therein.

The first hole 2 continues as a second hole 5 which leads to the surface of the matrix 1 and which is connected to the former by a shoulder 6. This latter serves to support a blank 7 before the method of the invention is put into effect.

The blank 7 essentially comprises a sleeve 7a and a relatively thick flange 7b. The depth of the second hole 5 is greater than the thickness of the flange 7b.

The apparatus comprises, moreover, an upper die member 8 capable of entering the second hole 5 of the matrix 1 and heavily compressing the flange 7b. The die member 8 is provided with a central hole 9 of which the diameter is slightly greater than the external diameter of the sleeve 7a.

In the hole 9 is slidably mounted an upper plunger 10 of which the lower extremity is adapted to enter the slevee 7a and the blind hole 4.

In order to obtain from the blank 7 a finished annular part of U-section, using the above-described apparatus, the following procedure is followed: the plunger 10 is lowered into the sleeve 7a, and, at the same time, the die member 8 is lowered into the hole of the matrix 1 where sufficient pressure is exerted to compress the flange 7b and to cause the metal to flow.

Figure 1:
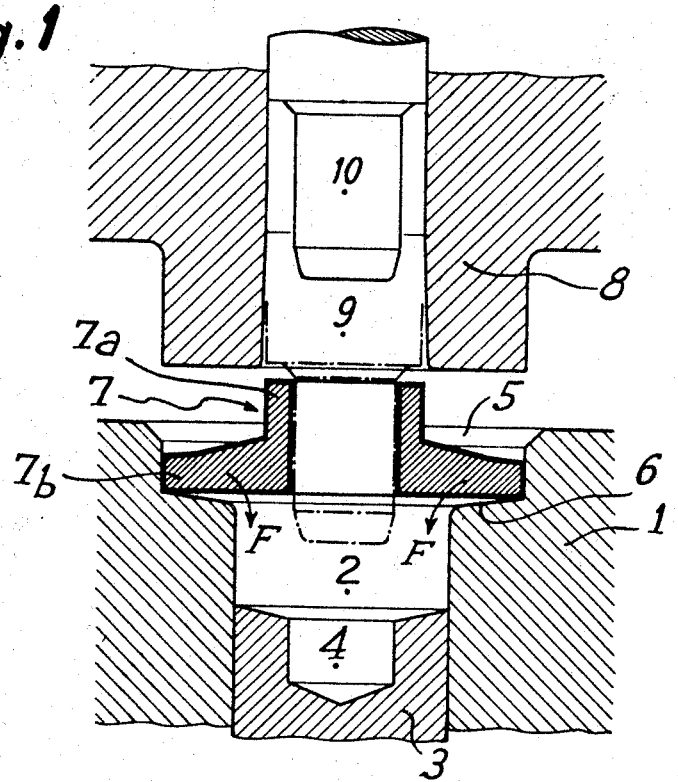
FIG. 1 shows an apparatus of the invention with a blank before the process of the invention is carried out.

There is shown in FIG. 1 in dash-dotted lines, the position of the plunger 10 at the start of the compressing operation. It will be observed that the face of the shoulder 6 is inclined towards the centre and that it is connected by means of a rounded-off portion with the interior surface of the hole 2. This arrangement facilitates the flow of metal in the direction of the arrows F. At the same time that a considerable portion of the metal of the flange 7b is displaced by metal flow, an axial displacement of the sleeve 7a parallel to itself is effected.

At the end of the operation there is obtained the finished annular part seen in FIG. 2. The flange 7b is very much reduced in thickness. The sleeve 7a has been displaced and is now at the other side of the flange 7b. The metal from the initial flange has formed a narrow annular part 7c which closely surrounds the displaced sleeve 7a. These two annular portions are joined at their lower end elongated from the flange, and thus form a U of which the two arms are in contact.

In the example considered, the finished part is a small round hexagonal nut having a washer incorporated therein, the pressure surface of the latter being outwardly displaced with respect to the corresponding extremity of the sleeve 7a. The latter is internally threaded so that there can be obtained relative movement between the pressure surface of the washer and the threaded sleeve.

The process and apparatus of the invention are applicable to different materials, principally metals, which can be worked hot or cold.

What is claimed is:

1. A method of making annular articles having any desired shape blank consisting of a sleeve and a flange, comprising the steps of: axially displacing the sleeve with respect to the flange, and simultaneously displacing the flange by metal flow so as to form a narrow annular portion surrounding the displace sleeve.

2. The method of claim 1, wherein said sleeve and said flange are simultaneously displaced by the high pressure action of separate means.

3. A press for making annular articles, comprising a lower matrix having a first hole closed at its lower end by a closure member, and wherein the lateral internal face thereof corresponds to the lateral external face of the finished annular article; a second hole, coaxial with and a forming continuation of said first hole, said second hole leading to the upper surface of the matrix and having a depth greater than the thickness of the flange of the blank; an upper die member adapted to enter the second hole of the matrix, having a hole therein, the diameter of said hole in said upper die corresponding to the external diameter of the sleeve of said blank; and a plunger, slidably mounted in the hole of the upper die member, having a lower portion, of a length substantially equal to the height of the finished article, with a diameter which corresponds the diameter of a central opening in said blank.

4. The press of claim 3 wherein the closure member slides within the first hole and acts as an ejector.

5. The press of claim 3, in which the closure member has a blind hole whose diameter corresponds to that of the lower portion of the plunger so that said lower portion is capable of entering said blind hole.

6. The press of claim 5, wherein said upper die member and said plunger are simultaneously actuated so as to form said finished article in said lower matrix.

References Cited

UNITED STATES PATENTS

| | | | |
|---|---|---|---|
| 1,410,093 | 3/1922 | Dallmeyer | 72—359 |
| 2,583,270 | 1/1952 | Lynall | 72—354 |
| 2,714,450 | 8/1955 | Chestnut | 72—358 |
| 3,365,926 | 1/1968 | Price | 72—358 |

CHARLES W. LANHAM, *Primary Examiner.*

G. P. CROSBY, *Assistant Examiner.*

U.S. Cl. X.R.

72—359, 377